United States Patent Office 3,551,959
Patented Jan. 5, 1971

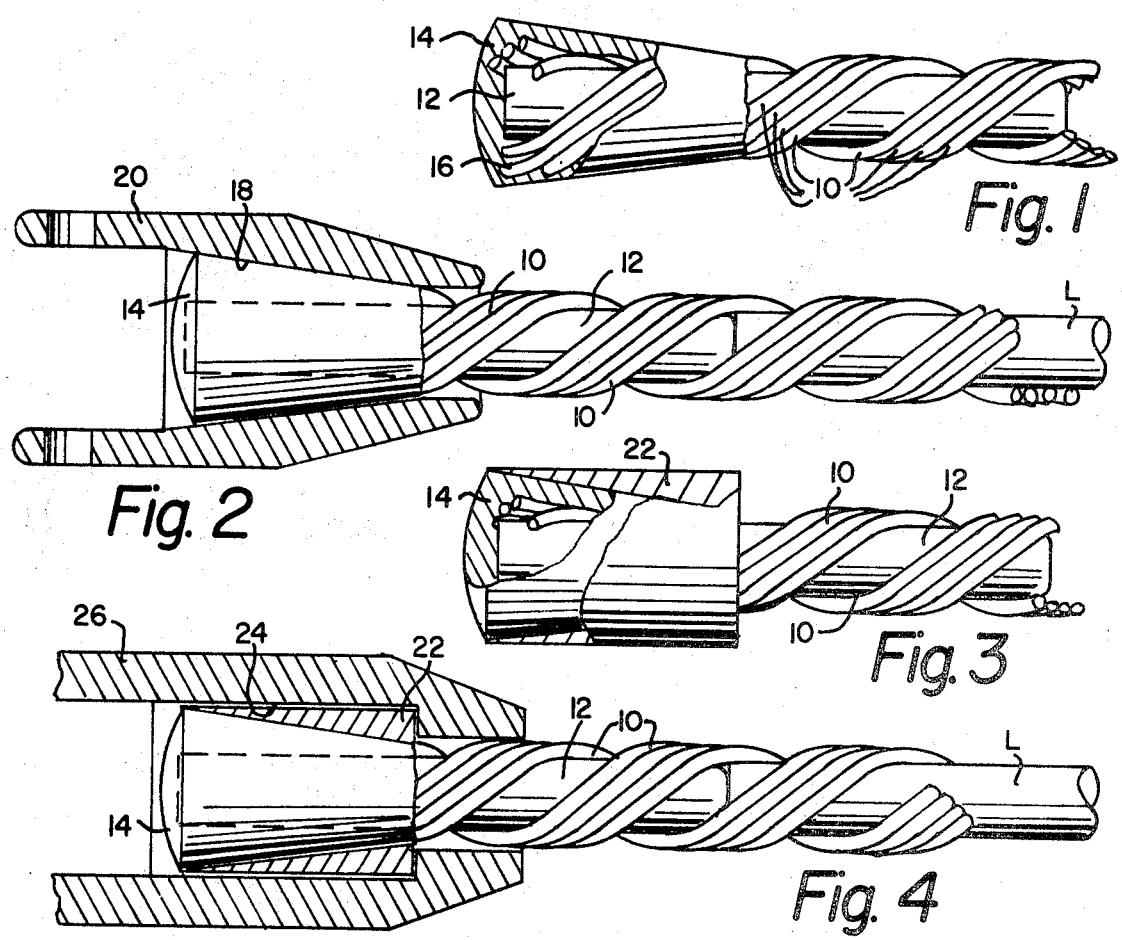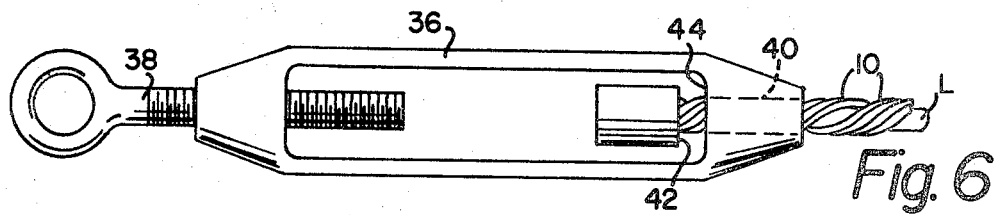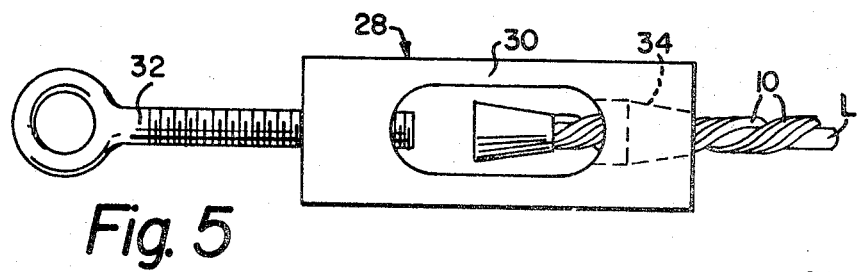

3,551,959
DETACHABLE SOCKETED DEAD END
Henry N. Mastalski, Lakewood, Ohio, assignor to The Fanner Manufacturing Company, a Division of Textron Inc., Cleveland, Ohio, a corporation of Rhode Island
Filed May 16, 1968, Ser. No. 729,619
Int. Cl. F16g 11/03, 11/14
U.S. Cl. 24—123      10 Claims

ABSTRACT OF THE DISCLOSURE

A field applied dead end fitting for gripping a linear body wherein a plurality of helically preformed resilient elements are bonded together in a socket member. The socket member is configured for detachable mounting on various types of attachment devices, such as turnbuckles, or socket housings for wire rope and the like.

---

This invention relates to gripping devices, and more particularly to dead ending devices for gripping a line. In still more particular aspects this invention relates to a dead ending device wherein the ends of helically formed rods are encapsulated within solidified material in a socket and which socket detachable mounts on various types of attachment devices such as turnbuckles, wire rope socket housings, and the like.

There have been many prior art proposals for the gripping of linear bodies to form dead ends. Some of these proposals are the so-called factory applied dead ends. These are formed by physically securing the length of cable to be dead ended in socket housings at both ends. These fittings are applied at the factory and the length of cable or rod with the fittings applied are shipped to the place where they are to be installed. This procedure has a particular advantage in that the socket housing or fitting configuration can be selected to be compatible with the attachment device of the anchoring structure. However, this procedure of factory applied fittings has several serious drawbacks. Foremost among these is that the exact length of cable or rod must be determined and formed at the factory. If this length is not exactly right, the end fittings will not properly match or provide the correct tension. In many types of installations, it is not possible to predetermine with the required degree of accuracy the exact length of the guy lines.

Because of these drawbacks to factory applied fittings so-called field applied fittings are much more widely used than factory applied fittings. Several of these field applied fittings have utilized sets of helically preformed rods bent in the form of a hairpin to form a bight which will engage a support, and a pair of helically formed legs for wrappingly engaging the line to be dead ended.

These field applied fittings have the advantage that the cable may be cut to length in the field on the job and then the fitting applied. However, the field applied fittings have certain drawbacks. One of the principal drawbacks is that the attachment device of the anchoring structure is not always ideally suited for the dead end fitting. This often requires the use of extra hardware items, such as thimbles, bolts and plates, to adapt the attachment device to the dead end fitting. Also, in some larger sizes threading of the fitting through an otherwise compatible attachment device is sometimes difficult.

One of the outstanding advantages of dead end fittings of this invention is the provision of a socket type field applied fitting which overcomes these disadvantages and which can be easily applied to lines and which fitting is adapted to be removable inserted in several different types of housings and fitting devices, which can be selected in the field according to the anchoring requirement. Also, certain economies of manufacturing can be realized by the socket design of the dead end fittings of this invention.

These and other advantages will become apparent in the following description taken in conjunction with the accompanying drawing in which:

FIG. 1 is an elevational view, particularly in section with parts broken away for clarity, of one embodiment of a gripping device according to this invention;

FIG. 2 is a side elevational view partially in section of the gripping device of FIG. 1 shown inserted in a wire rope socket housing and gripping a line being dead ended;

FIG. 3 is an elevational view, partially in section, with the parts broken away for clarity of another embodiment of a gripping device according to this invention;

FIG. 4 is an elevational view partially in section of the gripping device of FIG. 3 inserted in a socket housing and gripping a line being dead ended;

FIG. 5 shows the gripping device of FIG. 1, (on a reduced scale) inserted in a turnbuckle type device for dead ending a line; and FIG. 6 shows the gripping device of FIG. 3 (on a reduced scale) inserted in a different type turnbuckle device adapted to grip a line.

Briefly, the present invention contemplates the provision of a socket type, field applied dead end fitting having a plurality of resilient, helically formed rods or wires which are secured together at one end portion by an encapsulating material. The other end portions of the rods which project from the material are disposed to wrappingly engage a line. A core member is also embedded in the encapsulating material and projects therefrom within the confines of the helically formed rods and provides a stop against which a line to be gripped may be abutted. The encapsulating material at least in part defines a socket which is configured and arranged to be detachably inserted in any one of several different types of attachment devices.

Turning now to the drawing and for the present to FIG. 1, one embodiment of a field applied gripping device according to this invention is shown. The gripping device includes a plurality of helically formed resilient rods or wires 10 which are preformed to substantially conform to each other with respect to pitch length, internal diameter and hand of lay. The rods 10 preferably have an internal diameter slightly less than the diameter of the line to be gripped. The rods are adapted to be applied to a line from the side thereof without permanent deformation. Preferably the rods are formed from metal, such as galvanized hard drawn steel, or aluminum alloys, but other materials may be used. One end portion of each of the rods 10 is wrapped about a core member 12. One end portion of core 12 with the rods wrapped thereon is encapsulated within a solidified mass of encapsulating material. Preferably the ends 16 of the rods are broomed or spread out within the material 14, as shown, to increase the holding power and decrease their propensity to pull loose under tension. The encapsulating material 14 provides a plug like mass defining a socket from which the remaining end portion of each of the rods 10 extends. The helical formation of the rods within the encapsulating material increases the holding strength, but it is not essential that those portions of the rods in the encapsulating material be helically formed. It is only necessary that the portion to grip the line be helically formed.

The rods 10 are disposed so that they have a common central axis and are adapted to wrappingly engage a line to be dead ended. The core 12 also projects from the end of the encapsulating material 14 and extends within the confines of the rods. The fitting is thus adapted to grip the end of a cable, or line or the like, and be removably mounted on various attachment devices, some of which will be described presently.

As can be seen, the configuration of the socket defined by the encapsulating material 14 is generally frusto-conical. This shape is advantageous when the device is to be inserted into a frusto-conically shaped opening such as the opening 18 shown in the holding device 20 of FIG. 2. This figure illustrates the use of the detachable device with a conventional wire rope socket housing which is adapted to be secured to some type of anchoring device. When the fitting is used in this manner, the tension pull on the gripping device by the line L will cause a compressive force to be exerted by the attachment device 20 against the encapsulating material 14 which will tend to increase the holding power of the encapsulating material with respect to the rods 10. Thus, this frusto-conical shape is a desirable configuration.

In order to form the gripping device shown in FIG. 1, a mold having an interior cavity of the desired shape is provided. The rods 10 to be used are selected and wrapped around the core 12 and then the end portion of the core 12, with the rods wrapped thereon, is inserted into the mold cavity. The ends of the rods 16 then are broomed out, and the mold cavity is filled with the desired encapsulating material. This encapsulating material may be a metal such as zinc which has certain advantages, particularly when the helically formed rods are formed of galvanized steel, or it may be some other relatively low melting point alloy. For certain applications the encapsulating material may be plastic or any other material. This material must be able to be introduced into the mold and solidify, either by cooling or by chemical reaction, and bond the helically formed rods 10 as well as securely hold the encapsulated rods up to the maximum strength of the line which the device is to grip.

When the encapsulating material 14 has solidified in the mold it is broken loose from the mold and withdrawn therefrom. To aid in this, a parting compound may be applied to the mold prior to introduction of the material. When the solidified material is withdrawn from the mold it defines the socket from which the rods 10 project for wrappingly engaging the end of the line L as shown in FIG. 2.

Another embodiment of the gripping device according to this invention is shown in FIG. 3. In this enmbodiment annular sleeve 22 which surrounds the encapsulating material 14 together with the encapsulating material defines the socket which is generally cylindrical in shape. This type of gripping device is formed by a method similar to the method described in conjunction with FIG. 1, with the sleeve 22 being the mold into which the encapsulating material 14 is poured. In this case, of course, a parting compound is not applied, and if desired, the sleeve and encapsulating material may be so selected that a metallurgical bond is established therebetween. Hence, when the encapsulating material 14 has solidified, the mold and the material together become the socket from which the rods 10 project. This particular configuration of socket is particularly adapted to be inserted in a cylindrical opening found in an attachment device such as the opening 24 of the attachment device 26 shown in FIG. 4.

Turning now to FIGS. 5 and 6, these two figures illustrate how the various embodiment of the gripping device are utilized in different types of turnbuckle fittings. In FIG. 5, a specially adapted turnbuckle device 28 is shown. The turnbuckle 28 includes a central housing 30 having an eye screw 32 threaded into one end thereof. The opposite end of housing 30 is formed with a generally frusto-conically shaped cavity 34 which is adapted to recive a socket fitting of the type which is shown in FIG. 1. The rods project through the end and are disposed to grip the end of a wire or cable. The turnbuckle, which is attached to an anchoring device, is then twisted to apply the desired tension to the line.

FIG. 6 shows a conventional turnbuckle device used in conjunction with a fitting of this invention. In this embodiment the turnbuckle has a central housing 36 and an eye screw 38 threaded in one end thereof. The other end of the turnbuckle device has an aperture 40 through which the rods project. This combination of the gripping device and turnbuckle shown in FIG. 3 is particularly desirable since a flat end bearing surface 42 of minimal area is provided which bears against an inner surface 44 which will present a minimum amount of resistance to turning of the turnbuckle. Additionally, this particular configuration allows a standard type turnbuckle fitting to be used which is readily available from commercial sources.

It is to be understood that the various configurations of the socket which are shown, as well as the illustrations of the different types of attachment devices are merely illustrative and that many other socket configurations and attachment devices could be employed. For example, it is readily apparent that a socket device with a threaded upper sleeve could be employed which could be threaded directly into one end of a turnbuckle device with the other end of the turnbuckle having a conventional threaded eyebolt. This would allow double takeup with adjustment of the turnbuckle rather than single, as is illustrated in FIG. 6.

Other types of socket configurations, as well as other attachment device configurations are virtually unlimited. The essence of the invention is that the socket fittings are made so that they are detachably securable to attachment devices, thereby providing an extremely versatile dead ending device for use with a linear body to be gripped.

The core, which is incorporated in the dead ending device, serves several purposes. First, it serves the function of providing a form on which the rods can be wound and maintained in proper relationship while the encapsulating material is being poured therearound and while it is solidifying.

The core also provides a stop surface against which the end of the line L is abutted when the gripping device is used to attach it to a line. It has been found that if there is any substantial unfilled space between the end of the line and the encapsulating material, there is a propensity or tendency for the helically formed rods 10 to collapse in this region when the line is under tension with the attendant failure of this region before the rated strength of the line is reached. This collapsing or necking down is also associated with a twisting action of the line which is undesirable, particularly with certain types of line, such as fiberglass, which are sensitive to torque stress. Hence, it is desirable, especially in heavy load applications, that there be no appreciable unfilled space within the confines of the helical members between the end of the encapsulating material and the end of the line.

However, when helical rods are encapsulated as shown, it is quite difficult to insert the end of the line L to be gripped to the end of the material 14. This is so, because the internal diameter of the helical elements is equal to, or slightly less than the diameter of the line L and since the elements are securely bonded they cannot be spread apart at the point where they enter the encapsulating material to allow for the line to be admitted up tight against the end of the material 18. Hence, if there is no core or projecting device projecting from the end of the material 14, there will be a space which, as explained above that is undesirable.

Even if the elements are spaced to be slightly larger in diameter at the place they exit from the encapsulating material, it is extremely difficult to push a line tight against the material. However, with the projection or core as described, helical rods 10 can be unwrapped from around the end of the core 10 to allow the line L to be easily abutted up against the end of the core 10 as shown in FIG. 2 and thereby prevent any unfilled space between the end of the line and the end of the plugs.

The core may be made of any convenient material and may either be rigid or flexible depending upon the application. The only requirement is that the core be compatible with the encapsulating material, i.e., that it not be destroyed or materially weakened by the heat if the encapsulating material is a molten metal, or by the chemical action or reaction if the encapsulating material is chemically cured plastic.

In order to prevent the end of the core from nicking the rods, it is desirable that the core be slightly tapered and rounded at the end thereof as shown. Any nicks are undesirable in that they tend to cause increased stresses at this point, with possible early failure, of the gripping rods 10.

Also, as is well known in the art, some type of grip enhancing material may be used on the rods 10. This may take the form of alumina, or other grit adhesively applied to the rods.

Although several embodiments of this invention have been shown and described, various adaptations and modifications may be made without departing from the scope of the invention as defined in the appended claims.

What is claimed:

1. A device for gripping the end of a linear body comprising a plurality of resilient elements each having first and second opposite end portions, at least the first end portions of said elements being helically formed to a self sustaining helical configuration, which configuration will return after deformation within the elastic limit, said helically formed portions substantially conforming to each other with respect to pitch length, hand of lay, and internal diameter, securing means including solidified encapsulating material bonding said second end portions together and forming a socket from which said first end portions of said elements project, a core having one end embedded in said socket and an opposite end extending therefrom and terminating within the confines of said resilient elements, at least a portion of said extending core being engaged by said elements, said elements having a common central axis and being free of interwoven portions with said second end portions extending a substantial distance beyond said core for wrappingly engaging a linear body, said socket member being configured for removable insertion into an attachment device.

2. The device of claim 1 wherein said socket is generally frusto-conically shaped.

3. The device of claim 1 wherein said socket includes a sleeve member surrounding said encapsulating material.

4. The device of claim 3 wherein said sleeve member includes a generally cylindrical outer surface and a frusto-conical cavity in which said encapsulating material is disposed.

5. A device for gripping the end of a linear body and securing said body comprising in combination; a plurality of resilient elements each having first and second opposite end portions, at least the first end portions being helically formed to a self sustaining configuration which configuration will return after deformation within the elastic limit, said helically formed portions substantially conforming to each other with respect to pitch length, hand of lay, and internal diameter, securing means including solidified encapsulating material bonding said second end portions together and forming a socket from which said first end portion of said elements project, said socket including a projection extending therefrom and termination within the confines of said resilient elements, at least a portion of said projection being engaged by said elements, said elements having a common central axis and being free of interwoven portions with said second end portions extending a substantial distance beyond said projection for wrappingly engaging a linear body; an attachment device, and said socket and said attachment device having coacting means removably mounting said socket on said attachment device.

6. The combination of claim 5 wherein said attachment device includes turnbuckle means.

7. The combination of claim 6 wherein said socketing device includes an outer sleeve with a bearing surface bearing against one end of said turnbuckle means and the other end of turnbuckle means has screw means threaded therein.

8. The combination of claim 5 wherein said attachment device includes a housing having a recess therein in which said socket is removably disposed.

9. The combination of claim 8 wherein said recess and said socket are both generally frusto-conically shaped.

10. The combination of claim 8 wherein said socket includes an annular sleeve member generally with a cylindrical configuration and said recess is of generally cylindrical configuration.

References Cited

UNITED STATES PATENTS

| 1,421,676 | 7/1922 | Daniel | 24—123.1UX |
| 1,214,709 | 2/1917 | Orr | 24—123.2UR |
| 1,577,003 | 3/1926 | Sunderland | 24—123.2UX |
| 1,680,347 | 8/1928 | Sunderland | 24—123.1UX |
| 1,879,006 | 9/1932 | Anderson | 24—123.1UX |
| 2,142,985 | 1/1939 | Kellems | 24—123.5UX |
| 2,398,013 | 4/1946 | Kyle | 174—79UX |
| 2,955,338 | 10/1960 | Gough | 29—460UX |
| 3,219,298 | 11/1965 | Ruhlman | 248—63 |

BERNARD A. GELAK, Primary Examiner

U.S. Cl. X.R.

24—131; 174—79